Sept. 18, 1928.  
W. C. READ  
1,684,684
ELECTROLYTIC RECTIFIER
Filed March 8, 1927
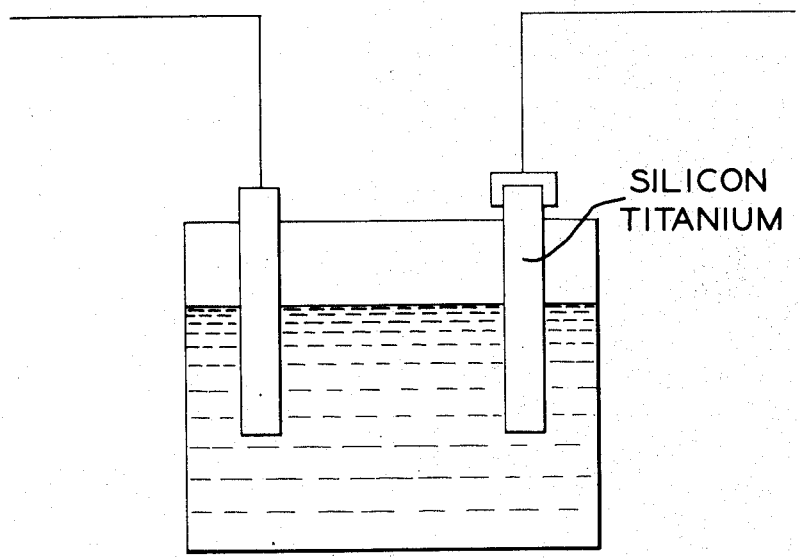
INVENTOR:  
William C Read,  
BY  
Townsend & Brickenstein,  
ATTORNEYS.

Patented Sept. 18, 1928.

1,684,684

UNITED STATES PATENT OFFICE.

WILLIAM C. READ, OF NIAGARA FALLS, NEW YORK, ASSIGNOR TO ELECTRO METALLURGICAL COMPANY, A CORPORATION OF WEST VIRGINIA.

ELECTROLYTIC RECTIFIER.

Application filed March 8, 1927. Serial No. 173,798.

The invention is an electrolytic rectifier comprising a novel cathode element.

Electrolytic rectifiers consist in general of an electrolyte and two electrodes. The interface between one electrode and the electrolyte exhibits approximately symmetrical conductivity, while the conductivity of the other interface is asymmetrical. The electrode of asymmetrical conductivity serves as cathode, and in the prior art has consisted of aluminum, tantalum, silicon or other material.

I have discovered that alloys of silicon with one or more of the metallic elements of the titanium group (of which titanium and zirconium are the principal members) possess marked advantages as materials for the cathode element in such rectifiers. These advantages include high efficiency and long life, together with moderate first cost and absence of excessive heating of the electrolyte during operation.

The single figure is a diagrammatic showing of the device of my invention.

The electrolyte may be chosen from a large number which are available. It may be strongly alkaline, as a solution of sodium hydroxide or other base; it may be approximately neutral, as a solution of borax or other salt; or it may be strongly acid, as a solution of sulphuric or other acid. Dilute sulphuric acid combines cheapness with excellent operating characteristics, and is preferred. When sulphuric acid is used, I prefer a solution containing 10% to 40% $H_2SO_4$, but any solution of suitable conductivity may be used.

It has been observed in the case of other electrolytic rectifiers, especially those employing an acid electrolyte, that the addition of a small proportion of a metal salt to the electrolyte may bring about an improvement in the efficiency of operation. I have found that an improvement may be similarly effected in the rectifier disclosed herein. With a sulphuric acid electrolyte I prefer an addition of ferrous sulphate, but the sulphates of cobalt, nickel, and vanadium can also be used with varying degrees of improvement, and doubtless there are other compounds capable of exerting a similar action. Furthermore, the effect last referred to can be obtained with widely different proportions of the improving agent. I mention merely by way of example an addition of one gram of ferrous or cobalt sulphate per hundred cubic centimenters of electrolyte as a satisfactory dosage.

The material of the anode may also vary, as in other electrolytic rectifiers. With a sulphuric acid electrolyte, pure lead, or a lead alloy such as antimony lead which may be preferred on account of its physical and chemical properties, give excellent results.

The cathodes may be of any suitable size and shape, and may be used as cast, but they are preferably freed from any adhering substances, and may be more or less polished to improve their appearance. By a comparative test on alloys containing different percentages of titanium-group metals, it was found that a content of such metals less than 10% does not impart much superiority over electrodes of substantially pure silicon, while alloys containing more than 55% of titanium-group metals tend to be porous and subject to gradual disintegration during use. I prefer a content of titanium-group metals within the range approximately defined by the percentages 20 and 40. Considering life, efficiency and mechanical properties, a total of about 35% titanium and/or zirconium is preferred. Elements other than silicon and titanium-group metals may of course be present.

I regard an annealed condition of the cathodes as being most favorable to long life. Any appropriate method of annealing may be used. A treatment which has proved suitable is to heat the cathodes slowly to about 1,000° C., hold them at this temperature for several hours, and then slowly cool them.

Electrical connection to the cathodes can be made in any suitable way. A lead or lead alloy cap cast about one end of the cathodes gives excellent results. The cathode should be thoroughly cleaned by abrasion or other means at the point where the cap is to be applied, to insure a low resistance contact. Good contact is also promoted by preheating the portion of the cathode to receive the cap, for example to about the melting point of lead, before casting the cap. The preheating can be accomplished without oxidizing the cleaned surface of the cathode by immersing the latter in molten lead for a sufficient time. With the cathode thus preheated the lead solidifies first at points remote from the cathode, forming a shell or case which promotes intimate contact with the cathode as the central portion of the lead solidifies.

My novel rectifiers will in general be used in conjunction with transformers, inductances or resistances to adjust the impressed voltage, but such accessories form no part of my invention. A sufficient quantity of electrolyte should be used to prevent overheating, and devices to promote radiation of heat may be employed. With very high currents, water-cooling may be desirable. My rectifiers have, however, only a slight tendency to heat up as compared with known electrolytic rectifiers in similar service.

The over-all power efficiency of the rectifier and transformer may exceed 40%, even in small installations, such as those for charging portable storage batteries. The efficiency falls off slightly as the frequency increases, but this effect is not serious within the usual range of frequencies.

The cathodes described herein can, under favorable conditions, be worked at current densities as high as several amperes per square inch, and in fact operate at higher efficiency as the current density is increased over a considerable range. Rectifiers using such cathodes are useful for charging batteries of various types and voltages, but are by no means restricted to this use. A bank of rectifiers constructed as herein described has been successfully used to rectify a current of 2,000 amperes for use in a commercial-scale electrolytic operation, the cathode in this rectifier operating at approximately 4 amperes per square inch.

In those claims where a certain percentage of titanium-group metal is specified, the number of metals of the group present may be one or more. If a plurality are present the figure given represents the sum of the percentages.

I claim:

1. An electrode for electrolytic rectifiers consisting of an alloy of silicon and titanium-group metal.

2. An electrode for electrolytic rectifiers consisting of an alloy containing silicon and about 10% to 40% of titanium-group metal.

3. An electrode for electrolytic rectifiers consisting of an alloy containing silicon and about 35% of titanium-group metal.

4. An electrode for electrolytic rectifiers consisting of an alloy of silicon and titanium-group metal in annealed condition.

5. An electrode for electrolytic rectifiers consisting of an alloy containing silicon and titanium-group metal, said electrode having a portion encased in lead composition to permit electrical connection to be made.

6. An electrode for electrolytic rectifiers consisting of an alloy containing silicon and titanium-group metal, said electrode having lead composition cast about an end portion.

7. An electrolytic rectifier comprising an anode, an electrolyte, and a cathode consisting of an alloy containing silicon and titanium-group metal.

8. An electrolytic rectifier comprising an anode, an electrolyte, and a cathode consisting of an alloy of silicon and titanium-group metal containing about 10% to 40% of the latter.

9. An electrolytic rectifier comprising an anode, an electrolyte, and a cathode consisting of an alloy of silicon and titanium-group metal in annealed condition.

10. An electrolytic rectifier comprising an anode, a sulphuric acid electrolyte, and a cathode consisting of an alloy of silicon and titanium-group metal containing about 10% to 40% of the latter.

11. An electrolytic rectifier comprising an anode, a sulphuric acid electrolyte containing a metal salt, and a cathode consisting of an alloy of silicon and titanium-group metal containing about 10% to 40% of the latter.

12. An electrolytic rectifier comprising an anode, a sulphuric acid electrolyte containing a metal sulphate, and a cathode consisting of an alloy of silicon and titanium-group metal containing about 10% to 40% of the latter.

13. An electrolytic rectifier comprising an anode, a sulphuric acid electrolyte containing ferrous sulphate, and a cathode consisting of an alloy of silicon and titanium-group metal containing about 10% to 40% of the latter.

14. An electrolytic rectifier comprising an anode of lead composition, an electrolyte, and a cathode consisting of an alloy of silicon and titanium-group metal.

15. An electrolytic rectifier comprising an anode of lead composition, a sulphuric acid electrolyte containing a metal sulphate, and a cathode consisting of an alloy of silicon and titanium-group metal containing about 10% to 40% of the latter.

16. An electrolytic rectifier comprising an anode of lead composition, an electrolyte of 10% to 40% sulphuric acid containing a metal sulphate, and a cathode consisting of an alloy of silicon and titanium-group metal containing 10% to 40% of the latter.

In testimony whereof, I affix my signature.

WILLIAM C. READ.